US012375193B2

(12) United States Patent
Feldhaus et al.

(10) Patent No.: US 12,375,193 B2
(45) Date of Patent: Jul. 29, 2025

(54) SIGNAL PROCESSING ASSEMBLY AND A METHOD FOR PROCESSING A PULSED SIGNAL

(71) Applicant: Rohde & Schwarz GmbH & Co. KG, Munich (DE)

(72) Inventors: Gregor Feldhaus, Munich (DE); Matthias Ruengeler, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 67 days.

(21) Appl. No.: 18/333,199

(22) Filed: Jun. 12, 2023

(65) Prior Publication Data
US 2024/0413914 A1    Dec. 12, 2024

(51) Int. Cl.
*H04B 17/20*      (2015.01)
*H04B 1/16*      (2006.01)

(52) U.S. Cl.
CPC ............ *H04B 17/254* (2023.05); *H04B 1/16* (2013.01)

(58) Field of Classification Search
CPC .................................................. H04B 17/254
USPC ........................................................ 375/224
See application file for complete search history.

(56) References Cited

U.S. PATENT DOCUMENTS

| | | | | |
|---|---|---|---|---|
| 6,246,733 | B1* | 6/2001 | Hutchins | G11B 20/1426 |
| 6,603,821 | B1* | 8/2003 | Doi | H04L 27/16 |
| | | | | 375/326 |
| 11,387,922 | B2 | 7/2022 | Feldhaus et al. | |
| 2006/0013199 | A1* | 1/2006 | Boora | H04L 63/08 |
| | | | | 370/352 |
| 2013/0336432 | A1* | 12/2013 | Turcotte | H03G 3/3078 |
| | | | | 375/346 |
| 2019/0393734 | A1* | 12/2019 | Zhou | H02J 50/12 |

* cited by examiner

*Primary Examiner* — Lihong Yu
(74) *Attorney, Agent, or Firm* — CHRISTENSEN O'CONNOR JOHNSON KINDNESS PLLC

(57) ABSTRACT

A signal processing assembly and a method for processing a pulsed signal are provided. The signal processing assembly includes a plurality of nth moment detectors including a first nth moment detector with a signal value detecting function and including at least one second nth moment detector with a signal value detecting function. Each of the plurality of nth moment detectors includes a filter with a sliding window, wherein the filter is configured to accumulate samples of signal values of the pulsed signal over a period of time within the sliding window. The first nth moment detector includes a maximum detector configured to determine a maximum signal value of the plurality of accumulated sample signal values of the first nth moment detector. The maximum detector is configured to control sampling by the at least one second nth moment detector such that a specific signal value of the plurality of accumulated sample signal values of the at least one second nth moment detector is obtained, wherein the specific signal value corresponds in time with the determined maximum signal value of the first nth moment detector.

12 Claims, 3 Drawing Sheets

SIGNAL PROCESSING ASSEMBLY AND A METHOD FOR PROCESSING A PULSED SIGNAL

TECHNICAL FIELD

The invention relates to a signal processing assembly and a method for processing a pulsed signal.

BACKGROUND

In general, it is well known that a power detection function at an input of a receiver allows adaption of the signal processing. If the signal processing is adapted to the power of the received signal, detection and measurement results can be improved, in particular regarding accuracy and detectability.

The averaged input power or the square root of the averaged input power (roots mean square-"RMS") is often one of the first parameter needed to setup an analyzer or a receiver effectively. Together with the maximum power, the crest factor of an input signal can be calculated. As described in U.S. Pat. No. 11,387,922 B2, there exists an optimum power level at an input of a first mixer stage to maximize the measurement dynamic. This power level is controlled by an attenuator at the input. Therefore, measuring the power is crucial to get an optimum attenuator level.

In the recent progress in the auto-leveling research of pulsed signals, it turned out that a power density evaluation of captured in-phase and quadrature (I/Q) data is superior compared to a sole power evaluation that loses some decibel (dB) of performance. The dynamic gain obtained by the power density evaluation of captured in-phase and quadrature (I/Q) data however comes together with a slow performance. Accordingly, the efficiency of the power density evaluation is low.

Therefore, there is a need to provide a signal processing assembly and a method for processing a pulsed signal for determining two or more moments of a received signal efficiently and with low effort.

SUMMARY

According to the present disclosure, signal processing assemblies and methods for processing a pulsed signal are provided. Such signal processing assemblies and methods may be used for a receiving assembly and/or a receiver.

Embodiment of the present disclosure provide a signal processing assembly for processing a pulsed signal. A pulsed signal may comprise an on-period and an off-period. The signal processing assembly may be part of a receiving assembly and/or a receiver, for example of a measurement, detection device and/or receiver device.

In an embodiment, the signal processing assembly comprises a plurality of nth (nth) moment detectors including a first nth moment detector with a signal value detecting function and including at least one second nth moment detector with a signal value detecting function. Each of the plurality of nth moment detectors includes a filter with a sliding window, wherein the filter is configured to accumulate samples of signal values of the pulsed signal over a period of time within the sliding window.

The first nth moment detector comprises a maximum detector configured to determine a maximum signal value of the plurality of accumulated sample signal values of the first nth moment detector. The maximum detector is configured to control sampling by the at least one second nth moment detector such that a specific signal value of the plurality of accumulated sample signal values of the at least one second nth moment detector is obtained. The specific signal value corresponds in time with the determined maximum signal value of the first nth moment detector.

Accordingly, a higher moment in addition to the second moment of the received signal, which is obtained based on the power, may be taken into account by the signal processing assembly. In addition, the signal processing assembly is more efficient compared to the power density evaluation of captured in-phase and quadrature (I/Q) data known in the state of the art.

In some embodiments, the plurality of nth moment detectors corresponds to a bank of coupled nth moment detectors, namely detectors for the nth moment. The respective detection time, e.g., the triggering of the plurality of nth moment detectors, is done by means of one of the plurality of nth moment detectors, e.g. the first nth moment detector. In other words, the first nth moment detector controls the sampling of the at least one other nth moment detector, namely the at least one second nth moment detector.

Accordingly, the specific signal value of the plurality of accumulated sample signal values of the at least one second nth moment detector is specific due to its temporal alignment with the maximum signal value determined by the maximum detector. The temporal alignment is achieved due to the controlling by the maximum detector. In other words, the temporal alignment is achieved since the specific signal value corresponds in time with the determined maximum signal value of the first nth moment detector.

In some embodiments, some or all of the plurality of nth moment detectors may comprise similar or identical filters and/or may comprise filters with an identical or similar filter structure. In some embodiments, one or more, for example all, of the plurality of nth moment detectors may comprise different filters and/or different filter structures. In case of different average lengths, the temporal alignment gets lost, which has to be compensated afterwards.

The determined maximum signal value of the first nth moment detector and the specific signal value(s) of the one or more second signal detectors may be used for setting of a receiver assembly, a receiver, a signal processing setting of the pulsed signal, and/or a setting of a detection and/or measurement circuit, for example.

An aspect provides that the signal processing assembly may comprise, for example, a register being configured to store the determined maximum signal value of the first nth moment detector and the specific signal value of the at least one second nth moment detector. In some embodiments, the register may be configured to store the latest determined maximum signal value of the first nth moment detector and the latest specific signal value of the at least one second nth moment detector. The register may comprise in this connection a non-volatile and/or a volatile data storage section. Further, the register may comprise a non-volatile and/or a volatile data memory section.

According to another aspect, the first nth moment detector may comprise, for example, a power detecting function. Hence, the power, which is used for determining the second moment (n=2), may be detected by the power detecting function of the first nth moment detector such that the first nth moment detector determines the second moment (n=2).

For instance, each of the nth moment detectors may comprise a determination circuit to provide respective samples of signal values of the pulsed signal regarding the specific moment of the respective nth moment detector. The respective samples of signal values provided by the determination circuit may be used directly or after preprocessing for accumulation by the filter. In certain implementations, two or more, in particular all of the nth moment detectors are configured to determine different moments. In some embodiments, two or more of the nth moment detectors are configured to determine the same moment, e.g. in case of different averaging.

A moment of a vector signal may be determined, for example, based on the p-norm $|x|\_p: =(\Sigma\_(i=1)^m x \overline{\overline{=}} x\_i|^p)^{\wedge}(1/p)$, wherein $|x|p$ may be the nth moment and m may be the length of a signal vector.

In some embodiments, one or more other or further norms may be used for determination of a moment. In some implementations, a moment of the signal may be determined based on an arbitrary mathematical function providing a specific moment.

According to an exemplary implementation, the determination circuit of the first moment nth detector may be configured to provide the square of the signal values of the pulsed signal as the samples. Hence, an instantaneous power may be provided by the first moment nth detector.

In other embodiments, the determination circuit of at least one of the at least one second nth moment detector may be configured to provide the fourth order of power of the signal values of the pulsed signal as the samples, e.g. the instantaneous squared power. Generally, higher orders of power than the instantaneous power may be taken into account as well. Actually, it turned out that some dynamic gain is achieved when considering more than only the second moment (based on the power).

According to a certain embodiment, the signal processing assembly may be configured to store each set comprising the determined maximum signal value of the first nth moment detector and the specific signal value of the at least one second signal detector. The signal processing assembly may therefore comprise a volatile and/or a non-volatile storage or a volatile and/or a non-volatile memory.

In certain implementations, one or more of the plurality of the nth moment detectors may comprise a preprocessing circuit, wherein the preprocessing circuit is configured to preprocess the respective samples of signal values of the pulsed signal before providing to the filter. The preprocessing circuit may be used to provide preprocessed data for the subsequent filter. The sample rate for the subsequent processing steps can be reduced, e.g. a parallel data stream (super-sampling) is reduced to a non-parallel data stream. This ensures that the filter can process the data obtained more efficiently, namely in terms of resources, thereby increasing the efficiency. Generally, a tradeoff resources versus accuracy has be found, e.g. between time resolution and sample rate.

In some embodiments, the preprocessing circuit comprises a block accumulator and/or a down-sampler to reduce a respective sampling rate. The block accumulator may output a sum of a certain number of consecutive power samples. The accumulator may reset after each block and outputs one sum result.

In further implementations, the sliding window of the filter of one or more, for example all, of the plurality of nth moment detectors may have a window length N, wherein the window length N may be based on a minimum pulse length of the pulsed signal. The window of the filter can be chosen as long as the minimum pulse length of the pulsed signal.

In certain embodiments, the filter of one or more of the plurality of nth moment detectors may be a finite impulse response, FIR, filter. Accordingly, the filter has an impulse response of N samples.

In some realizations, the filter of one or more of the plurality of nth moment detectors may be a first order decimating Cascaded integrator-comb, CIC, filter. Accordingly, the filter may comprise an integrator and a differentiator. Additionally, a down-sampler may be provided between the integrator and the differentiator. Generally, a CIC filter is an efficient implementation of a moving-average filter.

For instance, the window length N of the filter of the one or more of the plurality of nth moment detectors may be $N=R \times M$, wherein R is a decimation ratio of the filter and M may be the number of samples per filter stage of the filter. M may represent a differentiator delay of a comb section of the filter, for example the CIC filter.

Embodiments of the present disclosure also relate to a method for processing a pulsed signal. In an embodiment, the method comprises the steps of receiving a pulsed signal over a period of time, determining a plurality of orders of power of the pulsed signal along the period of time, determining, for each of the orders of power, a plurality of accumulated sample signal values by accumulating the respective orders of power of the pulsed signal by a filter with a window length N. determining a maximum signal value of the plurality of accumulated sample signal values of a first moment of a plurality of moments, and determining, for at least one further moment of the plurality of moments other than the first moment, a specific signal value of the plurality of accumulated sample signal values, wherein the specific signal value corresponds in time with the determined maximum signal value.

The above-mentioned advantages and effect also apply to the method in a similar manner.

In some embodiments, the method may further comprise the step of setting the signal processing assembly based on the determined maximum signal value and based on the one or more specific signal values.

In some embodiments, the method may additionally include the step of preprocessing one or more determined orders of power of the pulsed signal before determining, for each of the orders of power, a plurality of accumulated sample signal values.

In certain embodiments, the preprocessing may comprise block-accumulating and/or down-sampling of the one or more determined orders of power, in particular to reduce a respective sampling rate.

In some embodiments, the method relates to a computer-implemented method that can be executed on a computer.

Further embodiments of the present disclosure relate to a computer program product or computer readable media comprising instructions which, when executed by a computer circuit, cause the computer or computing device to carry out the steps of a method as described herein.

Another aspect relates to a data processing apparatus comprising, for example, a processor configured to perform the steps of a method as described above.

The signal processing assembly may be implemented in a signal analyzer or a signal receiver. Accordingly, a signal analyzer or a signal receiver may be provided that comprises the signal processing assembly as described above. In some embodiments, the signal analyzer or the signal receiver may relate to the data processing apparatus.

The signal analyzer or the signal receiver may comprise a programmable attenuator, a mixer, a lowpass filter, an analog-to-digital converter, an equalizer, a digital mixer, a (digital) lowpass filter and an attenuator control. The signal processing assembly may be connected between the (digital) lowpass filter and the attenuator control.

In some embodiments, the attenuator decreases the power of the input signal, e.g. a radio frequency (RF) signal, to operate the mixer at an optimum level. The mixer moves the signal down to a low intermediate frequency (IF) which can be sampled by the analog-to-digital converter (ADC) preceded by the lowpass filter, e.g. an anti-aliasing lowpass filter.

In some embodiments, the equalizer compensates for linear distortions which occur mainly behind the attenuator.

Since the signal processing assembly itself works preferable on a complex baseband signal, the digital mixer shifts the IF signal to the complex baseband and the (digital) lowpass filter removes the unused sideband. The signal processing assembly outputs the maximum power, based on which the optimum attenuator level is controlled accordingly.

However, the signal processing assembly could also work on the digital IF signal behind the equalizer instead on the complex baseband signal.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
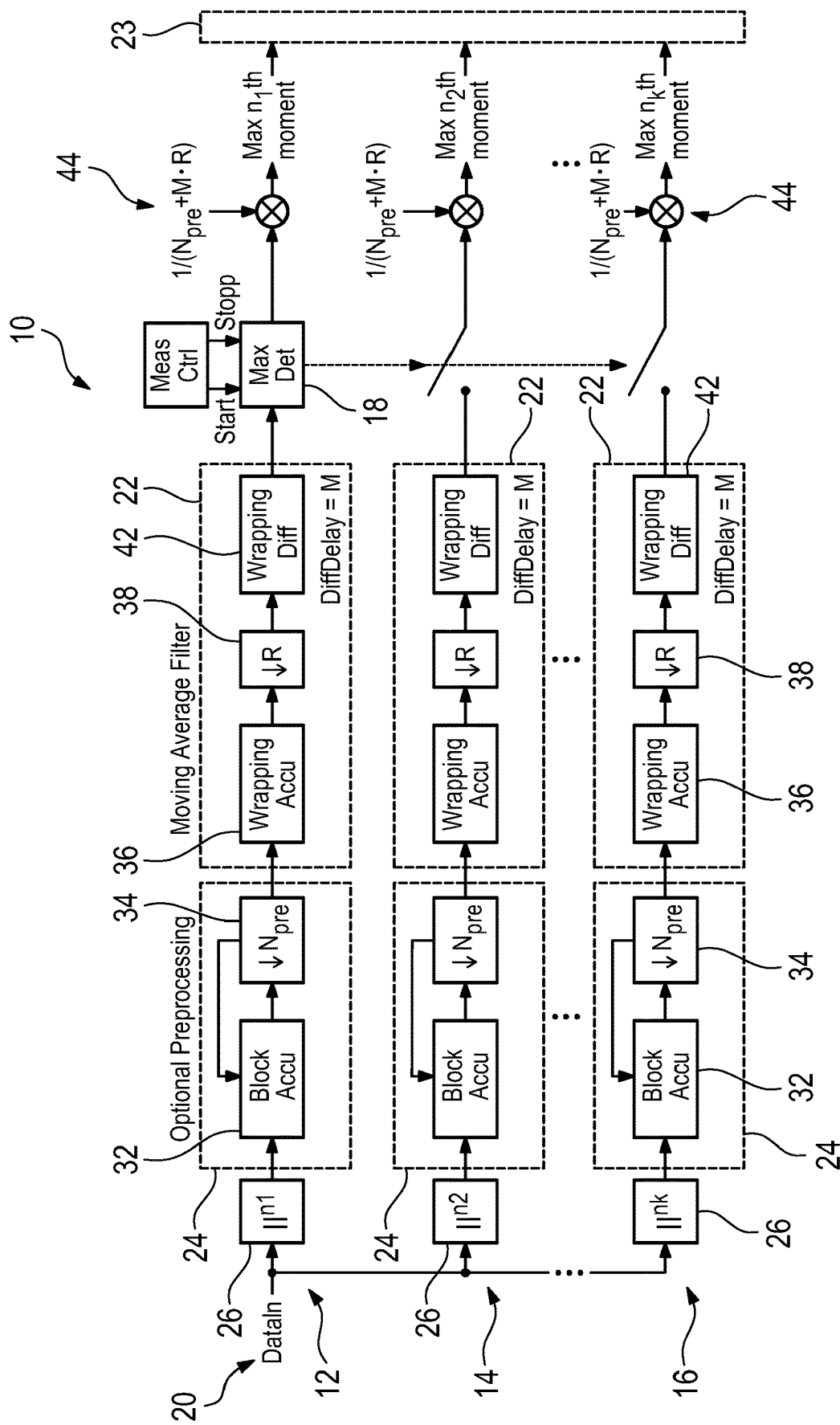
FIG. 1 shows schematically a signal processing assembly for processing a pulsed signal according to an embodiment of the present disclosure.

FIG. 1 shows schematically a signal processing assembly 10 for processing a pulsed signal (data) 20 in accordance with an embodiment of the present disclosure. The signal processing assembly 10 comprises a plurality of nth moment detectors 12, 14, 16 including a first nth moment detector 12 with a signal value detecting function and including at least one second nth moment detector 14, 16 with a signal value detecting function. In the shown embodiment, k-1 second nth moment detectors are provided. Each of the plurality of nth moment detectors 12, 14, 16 includes a filter 22 with a sliding window, wherein the filter 22 is configured to accumulate samples of signal values of the pulsed signal over a period of time within the sliding window.

In the embodiment shown, the first nth moment detector 12 comprises a maximum detector 18 configured to determine a maximum signal value of the plurality of accumulated sample signal values of the first nth moment detector 12. The maximum detector 18 is configured to control sampling by the at least one second nth moment detector 14, 16 such that a specific signal value of the plurality of accumulated sample signal values of the at least one second nth moment detector 14, 16 is obtained, wherein the specific signal value corresponds in time with the determined maximum signal value of the first nth moment detector 12.

In FIG. 1, two of the several second nth moment detectors 14, 16 are shown in detail. However, the number of second nth moment detectors may be also one or any other number, for example bigger than 2.

The signal processing assembly 10 may have the benefit that a plurality of moments of a pulsed signal may be considered at a specific time stamp, where a specific moment of the signal has a maximum with low effort and with low time delay. Therefore, a cheap, reliable, accurate and instantaneous signal processing is possible.

The signal processing assembly 10 comprises a register 23 that is configured to store the determined maximum signal value of the first nth moment detector 12 and the specific signal value of the second nth moment detectors 14, 16. Thus, setting configuration for processing the pulsed signal may be provided easily based on the data stored in the register 23.

In some embodiments, each of the nth moment detectors 12, 14, 16 comprises a determination circuit 26 to provide respective samples of signal values of the pulsed signal regarding the specific moment of the respective nth moment detector 12, 14, 16.

The respective samples regarding the specific moment may be used directly by the filter 22 of the respective moment detector 12, 14, 16 for accumulation.

In some embodiments, the first nth moment detector 12 may comprise a power detecting function. Accordingly, the determination circuit 26 of the first nth moment detector 12 may be configured to provide the square of the signal values of the pulsed signal as the samples. In some embodiments, the determination circuit 26 calculates the instantaneous power of the signal.

With a subsequent averaging provided by the filter 22, the second moment may be obtained.

Alternatively or additionally, the determination circuit 26 of the at least one second nth moment detector 14, 16 may be configured to provide the instantaneous squared power of the signal values of the pulsed signal as the samples.

With a subsequent averaging provided by the filter 22, the fourth moment may be obtained.

Generally, the instantaneous power or the instantaneous squared power relate to different orders of power. Thus, the respective determination circuit 26 of the nth moment detectors 12, 14, 16 determines different orders of power, also called "powers of different order".

The corresponding moment is obtained at the of the respective nth moment detector 12, 14, 16, namely after the respective filter 22. In some embodiments, the respective filter 22 takes some statistics into account, resulting in the respective moments.

Accordingly, different moments may be considered by the signal processing assembly 10 due to the different nth moment detectors 12, 14, 16.

In some embodiments, the signal processing assembly 10 may be configured to store each set comprising the determined maximum signal value of the first nth moment detector 12 and the specific signal value of the at least one second signal detector 14, 16.

The signal processing assembly 10 may therefore comprise a memory and/or a storage (not shown in the figures) and/or a data transmission circuit to a memory and/or a storage. The memory and/or the storage may include a volatile section and/or a non-volatile section.

Storing each data set including the determined maximum signal value of the first nth moment detector 12 and the specific signal value of the at least one second signal detector 14, 16 may be advantageous, if the pulsed signal (data) 20 may have different signal statistics over different time instances, for example signals in the 5G standard. The stored data may then be used to obtain signal information statistics with low effort and low data storing capacities based on the stored data sets.

In some embodiments, one or more of the plurality of nth moment detectors 12, 14, 16 may comprise a preprocessing circuit 24, wherein the preprocessing circuit 24 is configured to preprocess the respective samples of signal values of the pulsed signal, thereby obtaining preprocessed samples or preprocessed data. The preprocessing takes place before providing the data to the filter 22.

The preprocessing circuit 24 may be configured to reduce the sampling rate of the pulsed signal (data) 20 such that the amount of data provided to the filter 22 may be reduced and requirements on the filter 22 are simplified. The preprocessing circuit 24 may comprise a block accumulator 32 and/or a down-sampler 34, for example, to reduce a respective sampling rate. As a consequence, data amount and, thus, filter requirements of the filter 22 may be reduced.

The sliding window of the filter 22 of one or more of the plurality of nth moment detectors 12, 14, 16 may have a window length N, wherein the window length N may be based on a minimum pulse length of the pulsed signal.

In advantageous implementations, the filter 22 of one or more of the plurality of nth moment detectors 12, 14, 16 is a finite impulse response, FIR, filter.

In some embodiments, the filter 22 may be an infinite impulse response, IIR, filter. Advantageously, the filter 22 of one or more of the plurality of nth moment detectors 12, 14, 16 may be a moving average filter.

In some embodiments, the filter 22 of one or more, in particular of all, of the plurality of nth moment detectors 12, 14, 16 may be a first order decimating Cascaded integrator-comb, CIC, filter. A CIC filter is for example described by E. Hogenauer in "An economical class of digital filters for decimation and interpolation" in IEEE Transactions on Acoustics, Speech, and Signal Processing, vol. 29, no. 2, pp. 155-162, April 1981, which is herewith incorporated by reference.

The window length N of the filter 22, namely the first order decimating Cascaded integrator-comb, CIC, filter, of the one or more of the plurality of nth moment detectors 12, 14, 16 may be determined as N=R×M, wherein R is a decimation ratio of the filter 22 and M may be the number of samples per filter stage of the filter 22. "M" may represent a delay of the differentiator stage, e.g. a differentiator delay of a comb section of the filter 22.

In the following, an embodiment of a digital implementation of the signal processing assembly 10 is described with reference to FIG. 1.

In some embodiments, the filter 22 may be a moving average filter with a window length N=R×M, as shown in FIG. 1.

The optional preprocessing circuit 24 with the block accumulator 32 may be used to lower the sample rate for the subsequent processing steps, e.g. to reduce a parallel data stream (super-sampling) to a non-parallel data stream. The preprocessing circuit 24 also comprises the down-sampler 34 with a down-sampling factor Npre. Actually, the sampling rate is reduced to simplify the subsequent processing stages.

The filter 22 is located downstream of the preprocessing circuit 24. As shown in FIG. 1, the filter 22 comprises a wrapping accumulator 36 that accumulates the incoming samples, namely the ones (xin) received from the preprocessing circuit 24 according to the following.

$$Y\_accu\ (k) = x\_in\ (k) + x\_in\ (k-1)$$

Wrapping of the digital number format may be explicitly allowed if the accumulator register can store at least the sum of N maximum input samples. Thus, the input word width should be increased by $\lceil "\log"\rceil\_"2"\ (N)$ bits. The output of the accumulator 36 may decimated by R by a decimation circuit 38, thereby obtaining decimated samples xdec. The decimation circuit 38 is also part of the filter 22.

The filter 22 further comprises a wrapping differentiator 42 that may subtract the decimated samples xdec with a delay of M according to the following.

y_diff (k)=x_dec (k)-x_dec (k-M)

The differential delay M of the wrapping differentiator 42 may need memory resources and should be reasonable limited to a value Mmax, e.g. to one block RAM size of the computational circuit with which the filter 22 is implemented. To realize a window length N, two cases can be distinguished:

$N \leq M$ max $R=1, M=N$

This may be a sample by sample moving average filter.

$N > M\_\max$

Here a trade-off between R and M should be found. M may be chosen as high as possible, but the realizable window lengths are multiples of M, since R is integer.

In case b), the filter 22 may not be a sample-by-sample moving average filter, but for reasonable high memory length M, the step size is much shorter than the window length. The window may always be chosen nearly as long as the minimum pulse width.

In FIG. 1, it is further shown that the signal processing assembly 10 comprises a normalization circuit 44 for normalizing the determined maximum signal value of the first nth moment detector 12.

Additionally or alternatively, the specific signal value may be omitted, e.g. the specific signal value of the second nth moment detector 14 or the specific signal value of the second nth moment detector 16, when the filter 22 is configured to normalize itself based on the filter window length N (N=R×M) and optionally based on a down-sampling in the preprocessing circuit 24 by the down-sampling factor Npre.

Since the fourth moment shall be evaluated at the same window where the second moment which is associated with the power, has its maximum, the maximum detection circuit 18 is configured to control sampling by the at least one second nth moment detector 14, 16 such that a specific signal value of the plurality of accumulated sample signal values of the at least one second nth moment detector 14, 16 is obtained.

Hence, the specific signal value corresponds in time with the determined maximum signal value of the first nth moment detector 12.

This can be generalized to several coupled nth moment detectors 12, 14, 16 where only one of them has an actual maximum detector 18 and controls the sampling of the other detectors.

Figure 2:
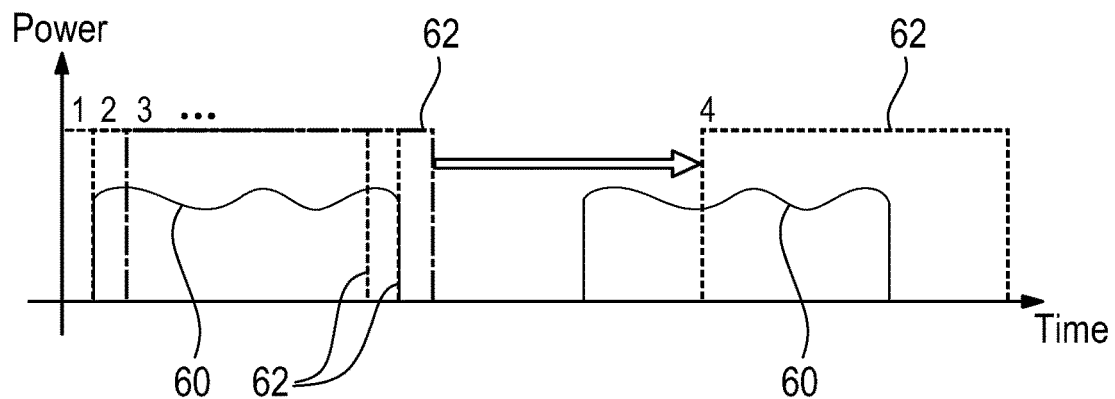
FIG. 2 shows schematically an example of a time diagram of the sliding window detector.

FIG. 2 shows schematically an example of a time diagram of the sliding window detector. On the x-axis the time is drawn up and on the y-axis the signal and the window form. When the window 62 is moving from time position 1 to time positions 2, 3 and 4, a discrete convolution of the pulsed signal 60 with the sliding window is provided.

Figure 3:
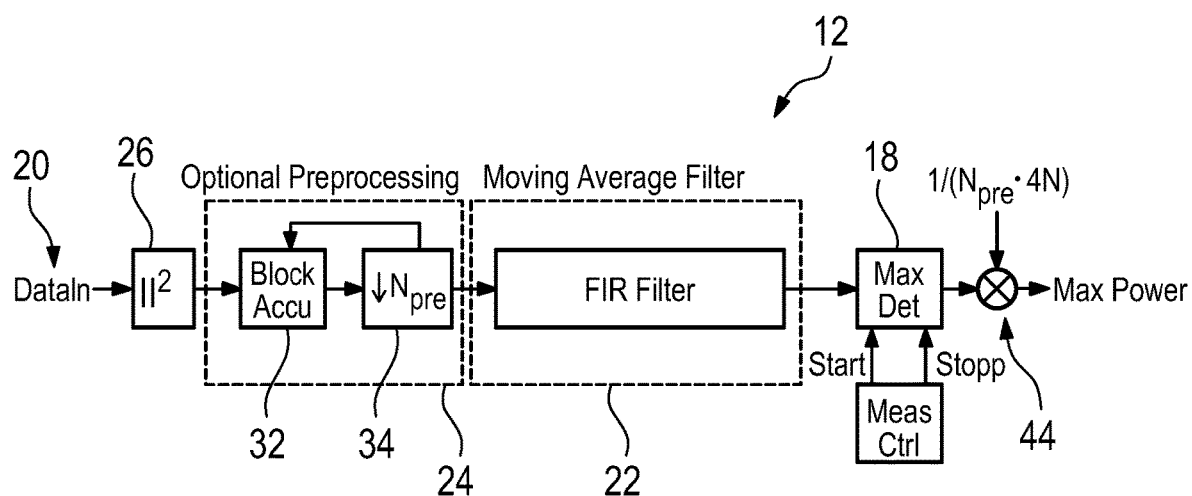
FIG. 3 shows schematically an example of a moment detector to be used in a signal processing assembly according to an embodiment of the present disclosure.

FIG. 3 shows schematically a moment detector that can be used in the signal processing assembly 10 according to another embodiment. As shown in FIG. 3, the filter 22 (moving average filter) may be realized by a finite impulse response FIR filter. Although, FIG. 3 is pointed to the first nth moment detector 12, the filter of one or more of the at least on second nth moment detector 14, 16, cf. FIG. 1, may be realized by the FIR filter as shown in FIG. 3.

Figure 4:
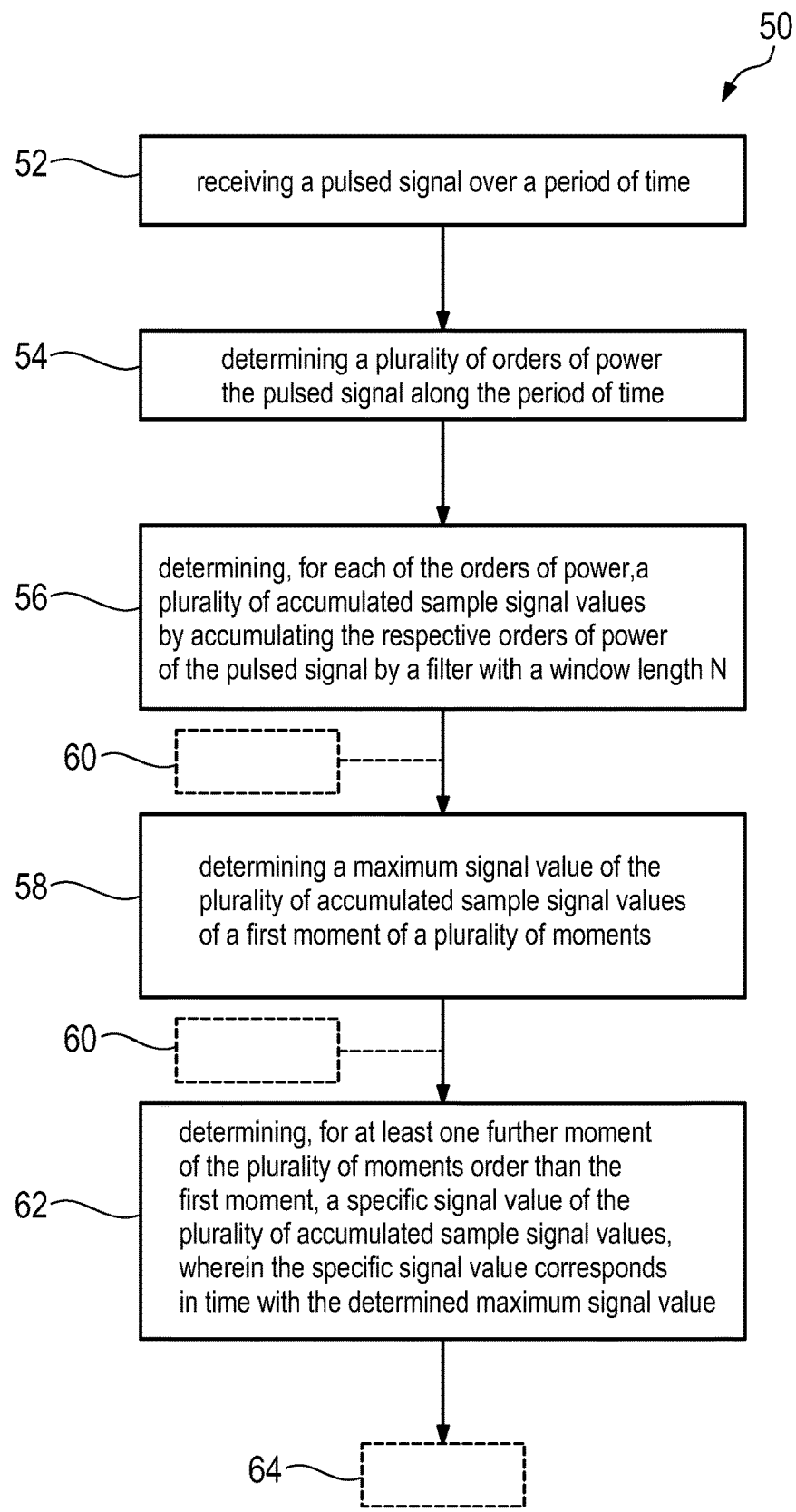
FIG. 4 shows schematically a method for processing a pulsed signal according to an embodiment of the present disclosure.

FIG. 4 shows schematically a method 50 for processing a pulsed signal according to an embodiment of the invention.

The method comprises the step S52 receiving a pulsed signal over a period of time, step S54 determining a plurality of different orders of power (e.g. the instantaneous power and the instantaneous squared power and so on) of the pulsed signal along the period of time, step S56 determining, for each of the different orders of power, a plurality of accumulated sample signal values by accumulating the respective different orders of power of the pulsed signal by a filter with a window length N, step S58 determining a maximum signal value of the plurality of accumulated sample signal values of a first moment of a plurality of moments, and step S62 determining, for at least one further moment of the plurality of moments other than the first moment, a specific signal value of the plurality of accumulated sample signal values, wherein the specific signal value corresponds in time with the determined maximum signal value.

In some embodiments, the method may comprise additionally the step of preprocessing one or more determined orders of power of the pulsed signal before determining, for each of the orders of power, a plurality of accumulated sample signal values. This optional step may relate to a step S60 as indicated by the dashed boy in FIG. 4.

In some embodiments, the preprocessing step may additionally comprise the steps of block-accumulating and/or down-sampling of the one or more determined orders of power to reduce a respective sampling rate.

In advanced implementations, the method may optionally comprise the step of setting a signal processing assembly 10 based on the determined maximum signal value and based on the one or more specific signal values. This optional step may relate to step S64 as indicated by the dashed box in FIG. 4.

In some embodiments, the signal processing assembly 10, for example as described based on FIGS. 1, 2 and 3 may be configured to execute a method as described above.

In some embodiments, a circuit may be implemented by software program code or by a module. In possible implementations, components, circuits, modules, units and/or assemblies etc. may be added, split up and/or combined without affecting the embodiments as described above.

Further, in some realizations method steps may be added, split up and/or combined without affecting the invention as described above. Further, the order of the method steps may be changed when the respective steps do not build on one another.

In some embodiments, one or more parts, in particular all parts of the signal processing assembly and/or one or more parts, in particular all parts of the signal processing method may be realized by software program code and programmable modules on which the software program code is executed. Doing so, the software program code may be stored in a memory and/or in a storage.

Certain embodiments disclosed herein include components, the filter 22, a preprocessing circuit 24, determination circuit 26, etc., utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some examples, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a graphical processing unit (GPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In some embodiments, the circuitry described above can include one or more computer-readable media containing computer readable instructions embodied thereon that, when executed by the one or more computer circuits, sometimes referred to as computing devices, cause the one or more computer circuits to perform one or more steps of any of the methods described herein.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately." "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A signal processing assembly for processing a pulsed signal, comprising:
a plurality of nth moment detectors including a first nth moment detector with a signal value detecting function and including at least one second nth moment detector with a signal value detecting function;
wherein each of the plurality of nth moment detectors includes:
a filter with a sliding window, wherein the filter is configured to accumulate samples of signal values of the pulsed signal over a period of time within the sliding window, and
wherein the first nth moment detector comprises:
a maximum detector configured to determine a maximum signal value of the plurality of accumulated sample signal values of the first nth moment detector;
wherein the maximum detector is configured to control sampling by the at least one second nth moment detector such that a specific signal value of the plurality of accumulated sample signal values of the at least one second nth moment detector is obtained, wherein the specific signal value corresponds in time with the determined maximum signal value of the first nth moment detector, wherein the sliding window of the filter of one or more of the plurality of nth moment detectors has a window length N, wherein the window length N is based on a minimum pulse length of the pulsed signal, and wherein the window length N is N=R·M, wherein R is a decimation ratio of the filter and M is the differentiator delay of a comb section of the filter.

2. The signal processing assembly according to claim 1, further comprising:
a register being configured to store the determined maximum signal value of the first nth moment detector and the specific signal value of the at least one second nth moment detector.

3. The signal processing assembly according to claim 1, wherein the first nth moment detector comprises a power detecting function.

4. The signal processing assembly according to claim 1, wherein each of the nth moment detectors comprises a determination circuit to provide respective samples of signal values of the pulsed signal regarding the specific moment of the respective nth moment detector.

5. The signal processing assembly according to claim 4, wherein the determination circuit of the first nth moment detector is configured to provide the square of the signal values of the pulsed signal as the samples.

6. The signal processing assembly according to claim 5, wherein the determination circuit of at least one of the at least one second nth moment detector is configured to provide the fourth moment of the signal values of the pulsed signal as the samples.

7. The signal processing assembly according to claim 1, wherein the signal processing assembly is configured to store each set comprising the determined maximum signal value of the first nth moment detector and the specific signal value of the at least one second signal detector.

8. The signal processing assembly according to claim 4, wherein one or more of the plurality of the nth moment detectors comprise a preprocessing circuit, wherein the preprocessing circuit is configured to preprocess the respective samples of signal values of the pulsed signal before providing to the filter.

9. The signal processing assembly according to claim 8, wherein the preprocessing circuit comprises a block accumulator and/or a down-sampler to reduce a respective sampling rate.

10. The signal processing assembly according to claim 1, wherein the filter of one or more of the plurality of nth moment detectors is a finite impulse response, FIR, filter.

11. The signal processing assembly according to claim 1, wherein the filter of one or more of the plurality of nth moment detectors is a first order decimating Cascaded integrator-comb, CIC, filter.

12. A signal processing assembly for processing a pulsed signal, comprising:
a plurality of nth moment detectors including a first nth moment detector with a signal value detecting function and including at least one second nth moment detector with a signal value detecting function;
wherein each of the plurality of nth moment detectors includes:
a determination circuit configured to provide respective samples of signal values of the pulsed signal regarding the specific moment of the respective nth moment detector; and
a filter with a sliding window, wherein the filter is configured to accumulate the samples of signal values of the pulsed signal, provided by the respective determination circuit, over a period of time within the sliding window, and
wherein the first nth moment detector comprises:
a maximum detector configured to determine a maximum signal value solely of the plurality of accumulated sample signal values of the first nth moment detector;
wherein the maximum detector of the first nth moment detector is configured to control sampling by the at least one second nth moment detector such that a specific signal value of the plurality of accumulated sample signal values of the at least one second nth moment detector is obtained, wherein the specific signal value corresponds in time with the determined maximum signal value of the first nth moment detector.

* * * * *